United States Patent Office 2,701,334
Patented Feb. 1, 1955

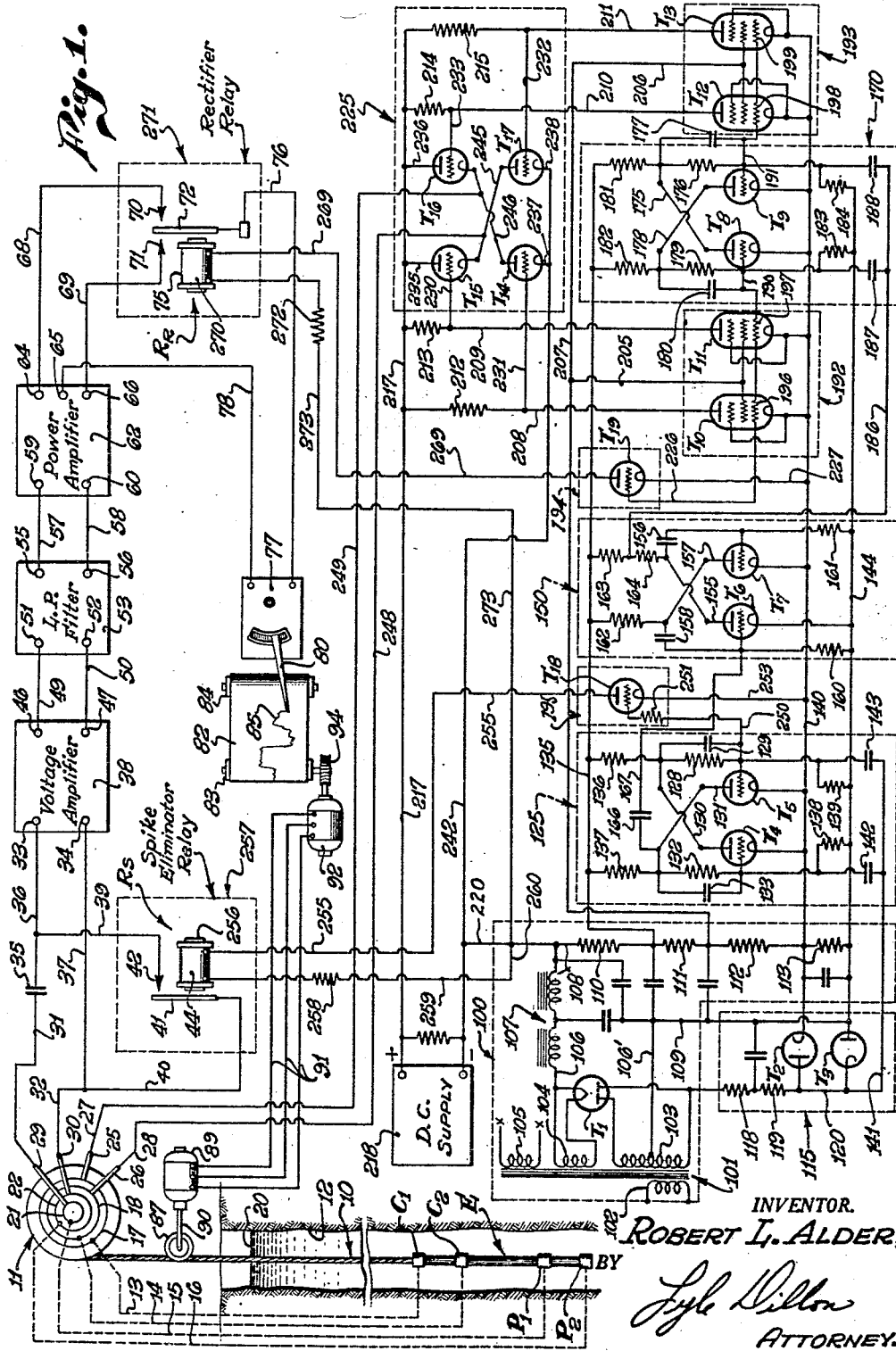

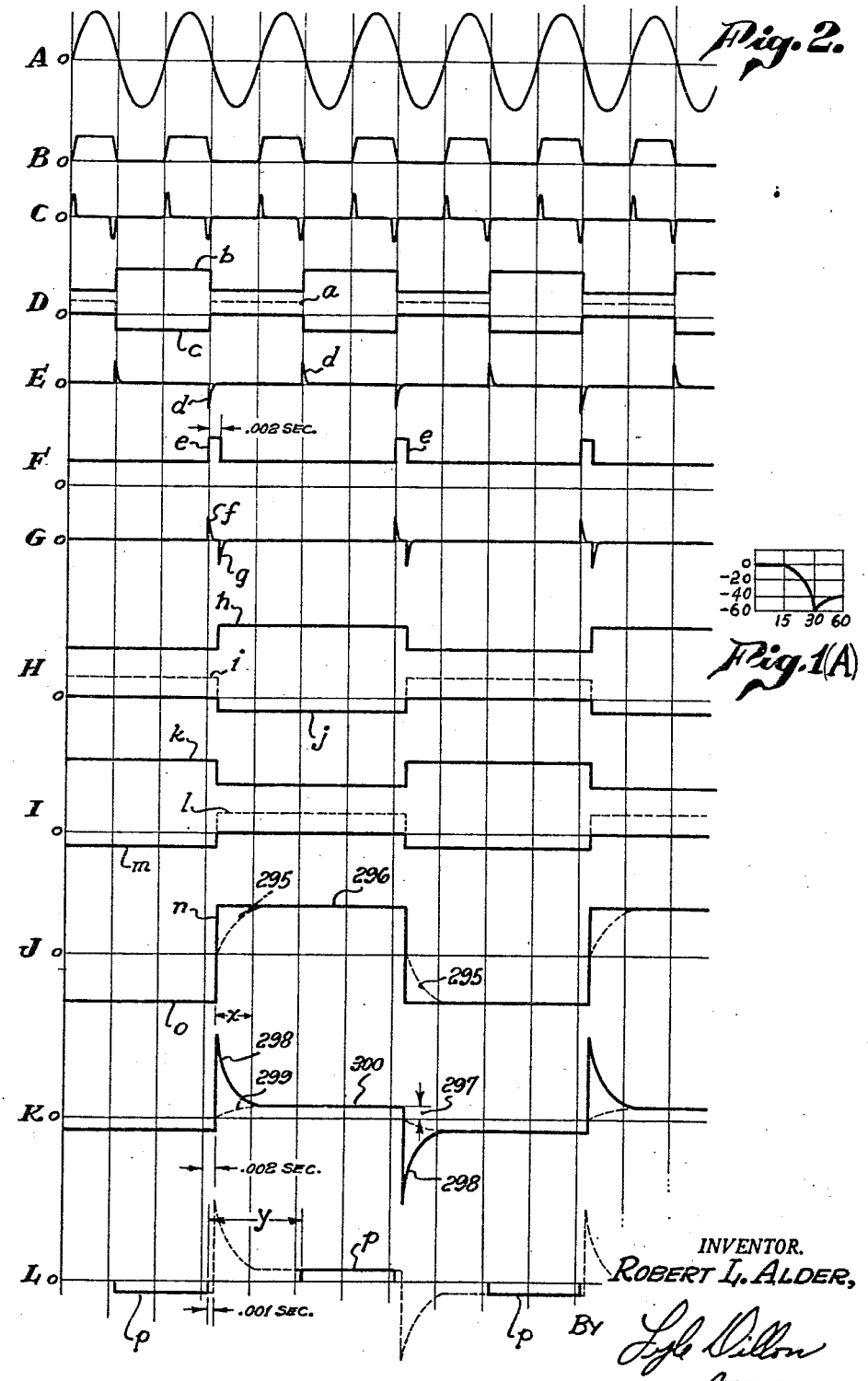

2,701,334

ELECTRICAL LOGGING OF WELL BORES

Robert Lee Alder, La Canada, Calif., assignor to Lane-Wells Company, Los Angeles, Calif., a corporation of Delaware Continuation of application Serial No. 52,747, October 4, 1948. This application June 16, 1953, Serial No. 362,105

14 Claims. (Cl. 324—1)

This invention relates in general to electronic switching devices and more particularly to an electronic square wave generator and associated switching apparatus adapted to be used principally in connection with a multiple electrode system of so-called electrical coring or electrical logging of well boreholes by means including a plurality of electrodes lowered into a well borehole on a multiple conductor cable in accordance with the general principles and method of operation disclosed in the Norelius Patent No. 2,569,867.

This application is a continuation of my copending application Serial No. 52,747, filed October 4, 1948.

In such systems of electrical logging, a suitable supply current is usually generated at the surface of the earth and conducted down through a pair of insulated conductors in a multiple conductor cable to a pair of current input electrodes located within and spaced apart a substantial distance along the longitudinal axis of the well borehole. These two input electrodes serve to set up an electric field within the formations traversed by the well bore. The resistivity measurements are generally made by a separate pair of longitudinally spaced potential pick-up electrodes positioned within the well bore either above or below the before-mentioned current input electrodes, the distance of the spacing between the pick-up electrodes and the adjacent current input electrodes being determined by the so-called lateral depth of penetration of the resistivity measurements desired.

The potential or current signal picked up from the thus established electric field within the formations traversed by the well bore by the potential pick-up electrodes is preferably conducted up the multi-conductor cable through a separate pair of insulated conductors which are connected at the surface exterior to the borehole to suitable measuring apparatus usually terminating in a recording galvanometer by means of which a continuous graphical record of the resistivity measurement variations versus depth, of the formations surrounding the borehole may be made as the electrodes are moved along the length of the borehole.

The input to the before-mentioned current input electrodes has usually been in the form of an alternating current in order to make it possible to make simultaneous resistivity and natural potential measurements, as is well known in the art. The use of alternating current for the resistivity measurements makes such simultaneous measurements possible by employing conventional electric filter circuits to segregate the resulting alternating signal picked up by the potential pick-up electrodes from the unidirectional signal resulting from the natural formation potential. The use of alternating current also has other important advantages, among them being the elimination of the undesirable effects upon the accuracy of the measurements caused by polarization on the surface of the current input and the potential pick-up electrodes which occurs when unidirectional current is employed.

As hereinbefore mentioned, such electrical logging systems necessitate the employment of a multi-conductor cable. Such a multi-conductor cable generally comprises a plurality of insulated conductors usually bunched or twisted together and extending throughout the length of the core of the cable and surrounded by one or more concentric lays of supporting steel wire strands. Such conductor cables may take several forms of construction. A construction heretofore employed in wells of relatively shallow depth resembles that of a rope and is made up of a plurality of twisted multiple wire strands, each strand containing an insulated conductor wire core. Another type of construction now being employed in present day wells of great depth is that known as the reverse concentric cable, and this cable is constructed of a plurality of concentric, spirally or helically wound single layers of wires, the lay of each layer being reversed with respect to the adjacent layer. In this cable a plurality of insulated conductors are located together in parallel or twisted arrangement at the core.

Of the two before-mentioned types of conductor cables the latter has the best mechanical characteristics for this type of service, but due to the close bunching and usual lack of shielding between the several conductors at the core of the cable, the electrical characteristics, in so far as they relate to interconductor capacity and electrical balance, have been found to be less desirable than those of the first-mentioned type of conductor cable.

However, in any event, with any presently known type of conductor cable it has been found to be impossible by any manufacturing process yet developed, or any other known means, to attain a perfect balance in the electrical capacity distribution and magnetic coupling between the several insulated conductors thus contained within the cable. Accordingly, the result has always been, heretofore, that when an alternating current is introduced into one pair of the conductors in such a cable, a spurious alternating current or potential has been produced in the other pair or pairs of conductors in the cable as a result of such electrical unbalance. Thus, when an alternating current was applied to the pair of conductors leading to the input current electrodes, a spurious alternating signal was produced in the pair of conductors leading up from the potential pick-up electrodes which was superimposed upon the desired signal received directly by the pick-up electrodes and delivered to the measuring circuits. An error was thus introduced into the resistivity measurements. Heretofore in wells of modern depth and under conditions where a relatively shallow lateral penetration of resistivity measurements was required, the before-mentioned spurious signal was tolerated as being of insufficient magnitude to render the measurements unusable, although introducing a recognized error.

Now, however, as well boreholes, particularly oil wells, are being drilled to relatively greater depths necessitating extremely long conductor cables of high strength, and in view of the requirements for deeper lateral penetration of resistivity measurements and greater refinement, accuracy, and detail in these measurements, the spurious effects of the electrical unbalance between conductors in the cable have grown to a magnitude which in the absence of suitable corrective measures nearly obscures the resistivity measurements sought to be obtained. The usable sensitivity of this method of electrical logging at greater depths has thus, in effect, undergone a great reduction.

As disclosed in the before-mentioned Norelius Patent No. 2,569,867, it has been discovered that the undesirable effects of the electrical unbalance between the conductors in the conductor cable and at the same time all effects of reactance and impedance associated not only with the conductor cable but also with the logged formations, may be eliminated by employing an alternating input current in the pair of conductors leading to the input electrodes having a wave form which includes at some point a flat or substantially constant current portion, of which a square wave form is one special example. As a result of this form of input current, an alternating electric field of corresponding wave form is established in the surrounding formations between the input electrodes. This alternating field is tested or sampled by means of a pair of spaced potential pick-up electrodes located in the borehole as hereinbefore mentioned, the signal received by the pick-up electrodes transmitted up through another pair of conductors in the conductor cable, and then only that part of the resultant returned signal from which have been eliminated all extraneous portions thereof which are due to or influenced by the electrical unbalance within the conductor cables and reactance or impedance effects of the conductor cable and the formations is utilized for the resistivity measurements.

Heretofore the generation of a square wave signal input to the pair of input electrodes for the hereinbefore described purposes has been accomplished largely by mechanical switching devices. Similarly the synchronization and phase control for the means for selecting that portion of the signal received by the pick-up electrodes which it is desired to utilize for the measurements, excluding thereby all extraneous signals resulting from the electrical unbalance between the conductors within the conductor cable and those due to reactance or impedance effects within the conductor cable and the formations, have been accomplished largely by mechanical means.

Such mechanical means and devices have, among a number of disadvantages, the undesirable inclusion of many moving parts subject to wear, susceptible to maladjustment, and productive of noise and vibration.

With the foregoing in view, it is, therefore, an object of this invention to furnish an improved square wave generator.

It is another object of this invention to provide an electronic square wave generator.

It is a further object of this invention to provide an improved square wave generator and associated switching and timing devices for accurately discriminating between the desired and undesired portions of the signal received by the electrical logging system herein described.

A potential difference substantially always exists between any electrode and a remote ground or between any two spaced electrodes in the fluid in the well borehole, known as the so-called "spontaneous potential" or the "natural potential." Consequently, a unidirectional natural potential difference usually exits between the pick-up electrodes of the resistivity measuring circuit, which is conducted through the conductor cable along with the alternating potential to the resistivity measuring circuit. This unidirectional potential has no effect upon the alternating potential resistivity measuring circuit so long as it remains at a constant value. However, when the electrodes are moved along the borehole, variations in the natural potential are encountered which appear in the measuring circuit as a varying signal which, by reason of such variation, introduces another error into the alternating current resistivity measurements.

It is accordingly another object of this invention to eliminate errors which would otherwise be introduced into the resistivity measurements by the effects of the variation of the natural potential difference picked up by the potential pick-up electrodes and introduced into the resistivity measurement circuits.

It is still another object of this invention to minimize errors in the resistivity measurements which would otherwise be introduced by pick-up from the alternating current power source.

These and other objects, advantages, and features of novelty will be evident hereinafter.

In the drawings, which illustrate a preferred embodiment and mode of operation of the invention and in which like reference characters designate the same or similar parts throughout the several views:

Figure 1 is a schematic wiring diagram of the apparatus of the invention;

Figure 1(A) is a graphical illustration of the electrical characteristics of a portion of the apparatus of Figure 1; and Figure 2 is a graphical illustration of the general characteristics and phase relationships of the electrical signals or impulses occurring at various locations in the electrical circuits of the apparatus.

The apparatus is as follows:

Referring primarily to Figure 1, 10 is a multi-conductor cable extending from a hoist drum 11 located at the earth surface into a well borehole 12 and carrying an electrode system assembly E at the lower end thereof. The insulated conductors contained within the cable 10 are diagrammatically illustrated in parallel dotted lines 13, 14, 15 and 16.

The electrode system E may be one of a number of arrangements well known in the electrical logging art for making lateral resistivity measurements, such as, for example, that disclosed in Schlumberger 1,819,923 or Bowsky et al. 2,142,555. One conventional arrangement is illustrated in Figure 1 hereof and comprises an upper pair of longitudinally spaced input electrodes $C_1$ and $C_2$ and a lower pair of longitudinally spaced, so-called potential pick-up electrodes $P_1$ and $P_2$, the two pairs being spaced longitudinally from each other and carried upon an elongated insulating tubular body through which the respective conductors extend from the lower end of the conductor cable 10 to the several electrodes. The cable conductors 13 and 14 make electrical connection at their upper ends at the cable drum with slip rings 17 and 18, respectively, mounted upon the drum or drum shaft for rotation therewith, and the lower ends of said cable conductors 13 and 14 are connected respectively to the beforementioned pair of spaced current input electrodes $C_1$ and $C_2$ of the electrode system E. Cable conductors 15 and 16 are connected at their lower ends with the beforementioned potential pick-up electrodes $P_1$ and $P_2$, respectively, and at their upper ends with another pair of slip rings 21 and 22, respectively, mounted on the hoist drum 11 or drum shaft together with the before-mentioned slip rings 17 and 18.

If desired, the electrode $C_1$ may be electrically connected to the lower end of the metal sheath of the cable 10, and thus the whole immersed length of the cable sheath may serve as a current electrode of extensive area and longitudinal length within the well. Electrical connection is made between the several electrodes and the formations surrounding the borehole 12 through conductive well fluid such as drilling mud maintained in the borehole, an upper level of which is illustrated at 20, or by means of suitable borehole wall positive contacting means when a relatively non-conducting well fluid such as oil is employed, as is well known in the art.

A pair of stationary brushes 25 and 26 make sliding electrical contact with the drum slip rings 17 and 18, respectively, and these brushes are connected through electrical connections 27 and 28 to the square wave generating apparatus and its associated pulsing and switching control circuits which supply the square wave alternating current to the input electrodes $C_1$ and $C_2$, as hereinafter more fully described. Another pair of stationary brushes 29 and 30 make sliding electrical contact with the drum slip rings 21 and 22, respectively, and these brushes are connected through electrical conductors 31 and 32 to the electrical measuring circuit and electrical log recording apparatus which receives the signal from the pick-up electrodes $P_1$ and $P_2$ to be measured, all as more fully described hereinafter.

The before-mentioned measuring circuit and electrical log recording apparatus is as follows: Conductors 31 and 32 leading from brushes 29 and 30 make connection through blocking condenser 35 and conductor 36 and through conductor 37, respectively, with the input terminals 33 and 34 of a suitable voltage amplifier 38, of conventional design. The two pick-up electrodes $P_1$ and $P_2$ are thus normally connected across the input of the voltage amplifier from electrode $P_1$ by way of cable conductor 15, slip ring 21, brush 29, conductor 31, condenser 35, and conductor 36 to terminal 33, and thence in return from terminal 34 through conductors 37 and 32, brush 30, slip ring 22, cable conductor 16 to electrode $P_2$. From the conductors 36 and 37 leading to the amplifier 38 a pair of conductors 39 and 40 make electrical connection with the armature 41 and contactor 42 of an electromagnetically operated relay as illustrated within dotted enclosure 257 and hereinafter referred to as a spike eliminator relay or transient eliminator relay $R_s$. The electromagnet or coil 44 of the relay $R_s$, when energized with a controlling, pulsating current, as will be described hereinafter in connection with the operation, causes the armature 41 to move into intermittent electrical contact with the contact point 42 to close the electrical circuit between conductors 39 and 40 and thereby periodically place a short-circulating shunt across the voltage amplifier input. A suitable relay for this purpose is manufactured by Stevens-Arnold, Inc., and designated Type 172, having a coil resistance of 1400 ohms and adapted to operate on 18 volts. This relay has a time constant of approximately .001 second when operated at this voltage.

The terminals 46 and 47 of the output circuit of the amplifier 38 are connected through conductors 49 and 50 to the terminals 51 and 52 of the input to a low-pass filter 53. This low-pass filter 53 is designed to have attenuation characteristics in accordance with the graphical illustration of Figure 1(A), as will be more fully described hereinafter in connection with the operation.

The output terminals 55 and 56 of the low-pass filter 53 are connected through conductors 57 and 58 to the input terminals 59 and 60 of a suitable power amplifier 62 of conventional design and preferably having a so-called push-pull output to which the three output terminals shown at 64, 65, and 66 make connection, the terminal 65 being the neutral or center tap connection. The output from the power amplifier is fed to a rectifier, preferably a full wave rectifier and preferably of a mechanical relay type such as that illustrated within the dotted enclosure 271 and hereinafter referred to as the rectifier relay $R_r$. The output terminals 64 and 66 of the power amplifier are connected through conductors 68 and 69 with opposite stationary contact points 70 and 71 of the rectifier relay $R_r$. An armature 72, spring mounted and resonated to vibrate at approximately the frequency of the power amplifier output frequency to be rectified, is positioned intermediate the contact points 70 and 71 and adapted alternately to make electrical contact with said points 70 and 71 when vibrated by the electromagnet 75 energized with a control current of suitable frequency, as described hereinafter in connection with the operation. The armature 72 of the rectifier is connected through conductor 76 to one terminal of a direct current meter or galvanometer 77, and the other terminal of the galvanometer is connected in return through conductor 78 to the center tap connection terminal 65 of the power amplifier 62.

A hand or pointer 80 which is attached to the movement of the galvanometer 77 carries a pen or other suitable marking device which bears upon a strip of graph paper 82 adapted to move between rollers 83 and 84 for the purpose of tracing a curve or making a graphical record of the deflection of the galvanometer hand, as illustrated at 85. The rate of motion of the graph or chart paper under the pen from roll 84 to roll 83 is preferably proportional to the rate of motion of the electrode system E into and out of the well borehole, and this proportional motion may be accomplished by coupling an idler pulley 84, over which the conductor cable 10 passes, with the paper transporting mechanism, through suitable means such as by a shaft, belt, or the like mechanical device similar to those disclosed in Jakosky Re. 21,797 or Elliott 2,222,608, or by electromechanical means as disclosed in Bowsky 2,142,555, or as schematically illustrated in Figure 1 herein, in which a Selsyn generator 89 is driven through a shaft 90 or other suitable gearing coupled to the idler pulley 87, and this generator in turn is remotely coupled electrically through conductors 91 to a Selsyn motor 92 which in turn drives the paper transporting roll 83 through suitable reduction gearing such as a worm gear drive as shown at 94.

The square wave generator circuits and the associated pulsing and timing control circuits and apparatus combined with the electrical logging are as follows:

For convenience of description the several principal unitary sub-assemblies of the circuit, which combine to make up the whole circuit diagram of the electrical apparatus of Figure 1, have been set apart within the several dotted line enclosures shown at 100, 115, 125, 150, 170, 192, 193, 194, 195, 225, 257, and 271.

Within the first mentioned dotted line enclosure 100 is a power supply substantially of conventional design for supplying the pulsing circuits with the various required currents and voltages, said supply comprising a power transformer 101 having a primary winding 102 and three secondary windings 103, 104, and 105, 103 being a high voltage center tapped winding, the end connections of which are connected to the anodes of a full wave rectifier tube $T_1$, 104 being a low voltage filament current supply for the cathode of the rectifier tube $T_1$, and 105 representing the winding or windings for supplying filament current or cathode heater current for all of the other electron tubes in the circuit, as conventionally indicated.

The rectified current from the cathode of the rectifier tube and the center tap of the transformer secondary is passed by way of conductor connections 106 and 106' through a conventional filter circuit as shown at 107, and the filtered D.-C. therefrom applied through conductors 108 and 109 across a voltage divider comprising a series of resistances 110, 111, 112, and 113.

A peak clipper or amplitude limiter circuit is shown within the dotted enclosure 115, comprising two diode electron tubes $T_2$ and $T_3$. The anode of diode $T_2$ and the cathode of diode $T_3$ are connected through a common conductor 120 and a pair of resistances 118 and 119 placed in series, to the end of the transformer secondary winding 103. The cathode of diode $T_2$ is connected to the voltage divider at the juncture point between resistances 112 and 113, and the anode of diode $T_3$ is connected through conductor 109 to the center tap connection 106' leading to the center tap of the transformer secondary winding 103. By these connections provision is made for impressing an alternating potential across diode $T_3$ and the same alternating potential plus a superimposed unidirectional potential, representing the drop across resistance 113, across diode $T_2$ to produce in conductor 141 a pulsating unidirectional potential as the output of the before-mentioned peak clipper circuit unit 115 as hereinafter more fully described in connection with the operation.

An Eccles-Jordan type trigger circuit is shown within the dotted enclosure 125, which serves as a first stage frequency divider. The Eccles-Jordan frequency divider, trigger circuit is now well known in the art, and more detailed explanations of its circuit and operation may be found in an article by Eccles and Jordan, Radio Review, vol. 1, 1919, page 142, or in several texts such as, for example, Theory and Applications of Electron Tubes by Herbert J. Reich, Ultra-High Frequency Techniques by Brainerd, Koehler, Reich and Woodruff, page 172, and others. In brief, the circuit comprises two triode electron tubes $T_4$ and $T_5$, the anode of tube $T_4$ being cross-coupled to the grid of tube $T_5$ through conductor 130 and resistor 128 shunted by condenser 129, and the anode of tube $T_5$ being likewise cross-coupled to the grid of tube $T_4$ through conductor 131 and resistor 132 shunted by a condenser 133. Anode voltage is supplied to the anodes of tubes $T_4$ and $T_5$ from a point near the positive end of the voltage divider intermediate resistors 110 and 111, through a positive lead conductor 135, and thence through anode resistors 136 and 137, respectively. The grids of the tubes $T_4$ and $T_5$ are connected through grid biasing resistances 138 and 139 to the negative end of the voltage divider through a negative bus connection 144. The cathodes of tubes $T_4$ and $T_5$ are connected to a negative bus connector 140 which leads to the voltage divider at a point between resistances 112 and 113 adjacent the negative end of the voltage divider. The two tubes $T_4$ and $T_5$ are electrically symmetrical with respect to their control grid biases and anode-cathode and grid voltages such that the trigger circuit has two degrees of stability in which either tube may be conducting and the other non-conducting. For example, if tube $T_4$ is conducting, the anode current voltage drop through resistance 136 is sufficient to drive the grid of $T_5$ to cut-off and at the same time, so long as tube $T_5$ is thus non-conducting, the grid of tube $T_4$ will remain sufficiently positive to permit continuation of flow of current therethrough. The circuit will remain stably in this condition until disturbed. Likewise, if tube $T_5$ is conducting, the anode current voltage drop through resistance 137 is sufficient to drive the grid of tube $T_4$ to cut-off, and the grid of tube $T_5$ will remain sufficiently positive to permit continuation of flow of current therethrough. Upon application of a sufficient negative potential pulse to the grids of tubes $T_4$ and $T_5$ through the differentiating coupling comprising condensers 142 and 143, that grid of the tube which is conducting at that time will be momentarily driven more negative, causing a reduction of anode current therein. For example, if tube $T_4$, is conducting, the negative pulse will lower the potential of its grid, resulting in a reduction of anode current through resistance 136. The resultant reduction in voltage drop through resistances 136 will in turn raise the grid potential of tube $T_5$, permitting anode current flow through tube $T_5$ and resistance 137. The resultant increase in voltage drop through resistance 137 will in turn further lower the potential of the grid of tube $T_4$. This action proceeds almost instantly to complete cut-off of tube $T_4$ and saturation current flow through tube $T_5$. Upon application of another negative triggering pulse, these steps are reversed, resulting in transfer of conductivity back to tube $T_4$.

The output from the before-mentioned peak clipper or amplitude limiter circuit 115 is coupled to the input of the Eccles-Jordan circuit 125 for supplying thereto negative potential triggering pulses, as hereinbefore mentioned. This coupling comprises a differentiating impedance network formed by conductor 141, a pair of differentiating condensers 142 and 143, and resistances 139 and 138 through which the anode of diode $T_2$ and cathode of diode $T_3$ are connected with the control grids of tubes $T_4$ and $T_5$.

A multivibrator circuit is shown within the dotted enclosure 150. This multivibrator serves as a phase shifting time delay circuit as and for the purpose described hereinafter in the operation. This type of circuit is well known in the art, and more detailed descriptions thereof may be found in several texts, for example, in Theory and Applications of Electron Tubes by Reich, page 355. In brief, the circuit comprises two triode electron tubes $T_6$ and $T_7$, the anode of tube $T_6$ being coupled through conductor 155 and condenser 156 to the control grid of tube $T_7$, and the anode of tube $T_7$ likewise being coupled through conductor 157 and condenser 158 to the control grid of tube $T_6$. The grids of tubes $T_6$ and $T_7$ are connected through grid biasing resistances 160 and 161 to negative bus conductor 144 which leads to the negative end of the voltage divider as before mentioned, and the cathodes of the tubes are connected to negative bus connections 144 and 140 which are in turn connected to the voltage divider as before described. Voltage is supplied to the anodes of tubes $T_6$ and $T_7$ through positive lead conductor 135 and thence through resistance 162 for tube $T_7$ and through resistances 163 and 164 for tube $T_6$. The tubes $T_6$ and $T_7$ are biased unsymmetrically and operated on different anode-cathode voltages such that, normally, in the absence of an initialing negative pulse, tube $T_6$ is conducting and tube $T_7$ is non-conducting. This is the stable condition of the circuit.

Upon application of a negative pulse to the control grid of tube $T_6$, a reduction in anode current therein is caused which increases the positive potential, or, in other words, reduces the negative bias on tube $T_7$ sufficient to permit anode current flow therein, which in turn reacts upon tube $T_6$ to still further reduce anode current in tube $T_6$ until tube $T_6$ is non-conducting and tube $T_7$ is conducting to saturation. This is the unstable condition of the circuit. Tube $T_7$ will conduct current for a period of time depending upon the time constant of condenser 156 and resistance 161, at the end of which time the before-described steps will automatically reverse, and the circuit will "flip back" or restore itself to its original condition of stability. The output from one side of the first stage Eccles-Jordan circuit, 125, is employed for supplying negative pulse excitation of the multivibrator 150, and this is taken from the anode connection of tube $T_5$ and thence passed through a differentiating impedance network comprising condenser 166, conductor 167, and resistance 160 and applied to the grid of multivibrator tube $T_6$.

Another Eccles-Jordan type trigger circuit, similar to that described hereinbefore, is shown within the dotted enclosure 170, which serves as a second stage frequency divider. This circuit comprises two triode electron tubes $T_8$ and $T_9$, the anode of tube $T_8$ being coupled to the grid of tube $T_9$ through conductor 175 and resistor 176 which is shunted by a condenser 177, and the anode of tube $T_9$ being likewise coupled to the grid of tube $T_8$ through conductor 178 and resistor 179 which is shunted by a condenser 180. Anode voltage is supplied to the anodes of tubes $T_8$ and $T_9$ from a point near the positive end of the voltage divider intermediate resistances 110 and 111, through the positive conductor lead 135 and thence through resistances 181 and 182, respectively. The grids of the tubes $T_8$ and $T_9$ are connected through grid biasing resistances 183 and 184 to the negative end of the voltage divider through the negative bus connection 144. The cathodes of tubes $T_8$ and $T_9$ are connected to negative bus connector 140 which, as before mentioned, leads to the voltage divider at a point between resistances 112 and 113 adjacent the negative end thereof.

An output connection is taken at a point between resistors 163 and 164 of the anode of tube $T_6$ of the hereinbefore described multivibrator, which leads through conductor 186 and a pair of differentiating condensers 187 and 188 to the grids of the Eccles-Jordan tubes $T_8$ and $T_9$.

The output from opposite sides of the Eccles-Jordan circuit are connected through conductors at 190 and 191, respectively, with the input circuits of two switching circuits respectively shown within the dotted line enclosures 192 and 193. The switching circuit 192 comprises a pair of pentode electron tubes $T_{10}$ and $T_{11}$, and the before-mentioned connection 190 from the Eccles-Jordan tube $T_8$ leads to the control grids 196 and 197 of these tubes.

The switching circuit 193 comprises a pair of pentode electron tubes $T_{12}$ and $T_{13}$, and the before-mentioned connection 191 from the Eccles-Jordan tube $T_9$ similarly makes connection with the control grids 198 and 199 of these tubes.

The cathodes of the two pairs of switching tubes of the switching circuits 192 and 193 are connected to the negative bus connector 140. All of the cathodes and the grids of the switching tubes are connected and operate in parallel. The anodes, however, of the pairs of switching tubes $T_{10}$, $T_{11}$, and $T_{12}$, $T_{13}$, lead through separate connections to other switching tubes, as hereinafter described.

The screens of the two pairs of switching tubes are connected through conductors 205 and 206 to a conductor lead 207 which in turn makes connection with the voltage divider at a point intermediate the series resistances 111 and 112.

The anodes of the two pairs of switching tubes, namely, tubes $T_{10}$, $T_{11}$, and $T_{12}$, $T_{13}$, are connected through conductors 208, 209, and 210, 211, respectively, and through resistances 212, 213 and 214, 215, respectively, and thence through conductor lead 217 to the positive terminal of another direct current supply 218. The negative terminal of the direct current supply 218 is connected through conductor 220 to the positive end 108 of the series of voltage divider resistances 110, 111, 112, and 113.

Within the dotted enclosure 225 is a square wave generating or switching circuit comprising four triode electron tubes as indicated at $T_{14}$, $T_{15}$, $T_{16}$ and $T_{17}$.

The anodes of the hereinbefore described switching tubes $T_{10}$ and $T_{11}$ are connected through conductors 208 and 209 and conductors 230 and 231 with the grids of switching tubes $T_{14}$ and $T_{15}$, respectively. Similarly the anodes of switching tubes $T_{12}$ and $T_{13}$ are connected through conductors 210 and 211 and conductors 232 and 233 with the grids of switching tubes $T_{16}$ and $T_{17}$, respectively. The anodes of switching tubes $T_{15}$ and $T_{16}$ are connected through conductors 235 and 236, respectively, to conductor 217 which, as before mentioned, leads to the positive terminal of the direct current supply 218. The cathodes of switching tubes $T_{14}$ and $T_{17}$ are connected at 237 and 238 with conductor lead 242, which in turn leads to the negative terminal of the before-mentioned direct current supply 218.

The cathode of switching tube $T_{15}$ is connected through cross-connector 245 with the anode of switching tube $T_{17}$, and similarly the cathode of switching tube $T_{16}$ is connected through cross-connector 246 with the anode of switching tube $T_{14}$.

A pair of conductors 248 and 249 are connected to the cross-connectors 245 and 246, respectively, and lead out to the input circuit of the electrical logging apparatus, as will be more fully described hereinafter.

Referring now again to the first stage Eccles-Jordan trigger circuit shown within the dotted enclosure 125, an electrical connection is made between the grid of triode $T_5$ through conductor 250 and resistor 251 to the grid of the triode switching tube $T_{18}$. The cathode of switching tube $T_{18}$ is connected through conductor 253 with the negative lead bus 140, and the anode is connected to the positive end 108 of the voltage divider by way of conductor 255, field coil 256 of a spike eliminator relay illustrated within the dotted enclosure 257, and thence through resistor 258 and conductors 259 and 260 to the before-mentioned positive end 108 of the voltage divider.

Referring again to the second stage Eccles-Jordan switching circuit within the dotted line enclosure 170 and the pair of pentode switching tubes $T_{10}$ and $T_{11}$ connected thereto, another switching triode electron tube is shown at $T_{19}$, the grid of which is connected through conductor 266 in common with control grids 196 and 197 of pentodes $T_{10}$ and $T_{11}$, respectively, to the grid of the Eccles-Jordan triode tube $T_8$. The cathode of switching tube $T_{19}$ is connected through conductor 227 with the negative lead bus 140. The anode of switching tube $T_{19}$ makes connection with the positive end 108 of the before-described voltage divider by way of conductor 269, field coil 270 of a rectifier relay electromagnet 75 as illustrated within the dotted enclosure 271, and thence through resistor 272 and conductor 273.

The operation of the before-described circuits and the apparatus, in connection with the electrical logging system, is as follows:

The primary 102 of the transformer 101 is supplied with an alternating current of suitable frequency, preferably relatively low and of sinusoidal wave form. Although other comparable frequencies may be employed, for convenience the frequency of 60 cycles per second is assumed to be supplied in connection with the following description of the operation of the apparatus.

The high voltage from secondary 103 of the transformer 101 is rectified and passed through the filter 107, and the resultant unidirectional potential applied to the opposite ends of a voltage divider comprising series connected resistances 110, 111, 112 and 113 from which the various voltage supply connections are made to the electron tubes in the circuit, as previously described.

Alternating current having a frequency of 60 cycles per second and a sinusoidal wave form as illustrated in Figure 2-A is obtained from the lower half portion of the center tapped transformer secondary 103 and applied through conductors 106' and 109 from one end thereof and through resistances 118 and 119 from the other end thereof and through conductor 120 to the diodes $T_2$ and $T_3$. It is to be noted that diode $T_3$ with series resistances 118 and 119 is connected directly across this alternating current supply, but diode $T_2$ with series resistances 118 and 119 is connected across this alternating current supply and the portion 113 of the voltage divider resistance. Diode $T_2$ thus has impressed upon it a predetermined D.-C. component in addition to an A.-C. component. These diodes are reversed with respect to one another, as shown, so that when one is conductive the other is inactive, and vice versa, and they thus operate in a conventional manner in conjunction with the resistances 118 and 119 as peak clippers or limiters resulting in a unidirectional pulsating output potential between conductors 141 and 144 having an approximately square wave form and of the same frequency as the supply current and appearing approximately as graphically illustrated in Figure 2-B.

The unidirectional pulsating potential of the form illustrated in Figure 2-B is applied through 141 to the differentiating condensers 142 and 143 with resultant pulsating potentials being simultaneously applied to the grids of electron tubes $T_4$ and $T_5$ of the first stage Eccles-Jordan trigger circuit having the approximate form illustrated in Figure 2-C, such pulsations having a frequency equal to that of the original alternating current supply or, in the present example, a frequency of 60 cycles per second. In accordance with the well known operating characteristics of the Eccles-Jordan trigger circuit, and as briefly outlined hereinbefore, the circuit has two degrees of stability, in each of which only one of the electron tubes $T_4$ or $T_5$ is conducting at a time, the grid of one of the tubes being driven to cut off potential and maintained there by such flow of current in the circuit of the opposite tube, and vice versa. Each time the grids of the electron tubes $T_4$ or $T_5$ receive a negative pulse, such as one of the negative peaks of the potential wave illustrated in Figure 2-C, the conductivity through the Eccles-Jordan trigger circuit is transferred from one tube to the other. For example, if tube $T_4$ happens to be initially conducting and tube $T_5$ in a non-conducting state, the first negative pulse impressed upon the grids of the tubes will result in the substantially instantaneous transfer of conductivity from tube $T_4$ to tube $T_5$; then upon impression of the second negative pulse upon the tubes, conductivity is again retransferred from tube $T_5$ to tube $T_4$, and so on, the conductivity alternating between tubes $T_4$ and $T_5$ so long as negative control pulses are supplied. The result is that for any one of the two tubes in the Eccles-Jordan trigger circuit the resultant frequency of its conductivity is half of that of the frequency of the applied negative control pulses or, in the present assumed case, 30 cycles per second. The resultant anode current in one of the tubes, for example, tube $T_5$, would appear as illustrated in dotted lines at (a) in Figure 2-D, and the corresponding anode voltage would appear as illustrated at (b) and each having a square wave form and a frequency of 30 cycles per second. The corresponding grid potential of tube $T_5$ is illustrated at (c).

The thus formed 30 cycle square wave potential (b) from the anode circuit of the Eccles-Jordan tube $T_5$ is impressed upon the differentiating circuit comprising condenser 166 with the resultant differentiation thereby to a peaked pulsating alternating current of 30 cycles per second in conductor 167 and through resistance 160 resulting in corresponding peaked alternating potential pulsations having the form of that graphically illustrated at (d) in Figure 2-E being applied to the grid of the multivibrator tube $T_6$. This multivibrator circuit enclosed within the dotted line 150 is biased, as hereinbefore described, in such a manner that normally when at rest in its stable condition, only tube $T_6$ is conducting and tube $T_7$ is non-conducting. The negative pulses applied to the grid of tube $T_6$ momentarily render is non-conductive, resulting in a temporary transfer of conductance to tube $T_7$ followed by an immediate "flip back" or return to its stable condition, in which condition tube $T_6$ resumes conductivity. The constants of this circuit are such, in the present example, that the duration of time between the application of each of the actuating negative pulses and the resultant transfer of conductance from tube $T_6$ to tube $T_7$ and return is approximately two milliseconds. The resultant voltage at the anode of tube $T_6$ will appear as graphically illustrated in Figure 2-F, the width of the square wave potential pulses shown at (e) representing the time interval when tube $T_6$ is non-conductive and tube $T_7$ is conducting and having a frequency of 30 cycles per second.

The resultant unidirectional potential pulses (e) from the anode of the multivibrator tube $T_6$ are passed through conductor 186 from a point intermediate the anode resistors 163 and 164 to the differentiating network hereinbefore described, comprising a pair of differentiating condensers 187 and 188 from which connections lead to the grids of the electron tubes $T_8$ and $T_9$ of the second stage Eccles-Jordan trigger circuit shown within the dotted line enclosure 170. Due to the differentiating action of this coupling network, the pulsating potentials applied to the before-mentioned grids of tubes $T_8$ and $T_9$ have the appearance graphically illustrated at (f) and (g) in Figure 2-G, the negative pulse portions (g) thereof having a frequency of 30 cycles per second. As before described in connection with the first stage Eccles-Jordan trigger circuit, at each negative pulse applied to the grids of tubes $T_8$ and $T_9$ of the second stage Eccles-Jordan trigger circuit, the conductivity is transferred from one tube to the other. The positive pulses have no effect. For example, if tube $T_8$ happens to be initially conducting and tube $T_9$ is in a non-conducting state, the first negative pulse impressed upon the grids of the tubes will result in the transfer of conductivity from tube $T_8$ to tube $T_9$; then, upon impression of the next negative pulse upon the tubes, conductivity is again retransferred from tube $T_9$ to tube $T_8$, and so on, the conductivity alternating between tubes $T_8$ and $T_9$. The result is that for any one of the two tubes in the Eccles-Jordan trigger circuit the resultant frequency of its conductivity is half of that of the frequency of the applied negative pulses or, under the present assumed conditions, a frequency of 15 cycles per second. The resultant anode current wave in one of the tubes, for example, tube $T_8$, would then appear as illustrated in dotted lines at (i), and the corresponding anode current wave in the tube $T_9$ would appear as illustrated in dotted lines at (l) in Figure 2-I. As a result of the anode current flow in tube $T_8$ and the corresponding voltage drop through resistor 181, the potential wave at the anode of tube $T_8$ and the grid connection of tube $T_9$ will have the appearance illustrated respectively at (h) in Figure 2-H and at (m) in Figure 2-I. Similarly, when tube $T_9$ is conducting and as a result of the voltage drop through resistor 182, the potential at the anode of tube $T_9$ and at the grid connection of tube $T_8$ will have the appearance illustrated respectively at (k) in Figure 2-I and at (j) in Figure 2-H. Since the control grids of pentodes $T_{10}$ and $T_{11}$ are connected at 190 with the before-mentioned grid connection to tube $T_8$, the potentials of said control grids of these pentodes will follow that of (j) of the grid of tube $T_8$. Similarly the control grids 198 and 199 of pentodes $T_{12}$ and $T_{13}$ will follow the potential (k) of the grid connection 191 of tube $T_9$. This will result in the alternate, parallel flow of current through pentodes $T_{10}$ and $T_{11}$ and pentodes $T_{12}$ and $T_{13}$ in phase with the anode current flow (i) and (l) for tubes $T_8$ and $T_9$, respectively, as illustrated in Figures 2-I and 2-J, the flow of pentodes $T_{10}$ and $T_{11}$ being 180° out of phase with the flow of pentodes $T_{12}$ and $T_{13}$ and at a frequency of 15 cycles per second.

When pentodes $T_{10}$ and $T_{11}$ are thus non-conductive, the grids of switching tubes $T_{14}$ and $T_{15}$, being connected respectively through resistors 212 and 213 with the positive lead connection 217 of the direct current supply 218, and in the absence of any flow of anode current from tubes $T_{10}$ and $T_{11}$ through these resistors, are biased positive with respect to the cathodes and hence are fully conductive. At the same time, while pentodes $T_{10}$ and $T_{11}$ are non-conductive, pentodes $T_{12}$ and $T_{03}$ are conducting, the anode current of tubes $T_{12}$ and $T_{13}$ resulting in potential drops through resistors 214 and 215 sufficient to reduce the potentials of the grids of switching tubes $T_{16}$ and $T_{17}$ to cut-off potential, thus rendering said switching tubes $T_{16}$ and $T_{17}$ non-conductive. Similarly, when pentodes $T_{10}$ and $T_{11}$ are conducting current and pentodes $T_{12}$ and $T_{13}$ are non-conductive, switching tubes $T_{16}$ and $T_{17}$ are rendered fully conductive, and switching tubes $T_{14}$ and $T_{15}$ are cut-off and non-conductive. In the first condition, where tubes $T_{14}$ and $T_{15}$ are conductive and tubes $T_{16}$ and $T_{17}$ are non-conductive, current may flow from the D.-C. supply 218 through conductor 242, triode switching tube $T_{14}$, cross-connection 246, conductor 249, and out in one direction to the electrical logging input electrodes $C_1$ and $C_2$, as hereinafter more fully described, and return through conductor 248, cross-connection 245, switching tube $T_{15}$, anode connection 235 and return to the D.-C. supply 218 through conductor 217. Next, when switching tubes $T_{16}$ and $T_{17}$ are conductive and switching tubes $T_{14}$ and $T_{15}$ are non-conductive, currents from the D.-C. supply 218 may flow through conductor 242, switching tube $T_{17}$, cross-connection 245 and conductor 248 out in the opposite direction to the electrical logging input electrodes and return through conductor 249, cross-connection 246, switching tube $T_{16}$, anode connection 236 and back to the D.-C. supply 218 through conductor 217. Thus it is seen that an alternating current of square wave form and having a frequency of 15 cycles per second is applied to conductors 248 and 249 leading to the input electrodes $C_1$ and $C_2$ of the electrical logging device, such applied current having a wave form substantially as graphically illustrated in solid lines at $(n)$ and $(o)$ in Figure 2–J.

Inasmuch as triode tube $T_{19}$ has its grid connected through conductor 266 with the control grids of pentodes $T_{10}$ and $T_{11}$, the resultant periods of conductivity thereof will be coextensive and in synchronism with the periods of conductivity of the pentode tubes $T_{10}$ and $T_{11}$, resulting in a pulsating unidirectional current through conductor 269, field coil 270 of the electromagnet 75 of the rectifier relay 271 and return through resistor 272, conductors 273 and 260 to the positive terminal 108 of the voltage divider. The field coil 270 of the rectifier relay ($R_r$) will thus be energized in synchronism with the switching action of switching tubes $T_{10}$ and $T_{11}$ or at a frequency of 15 cycles per second, with the result that the rectifier relay armature 72 will be caused to vibrate at 15 cycles per second, alternately making electrical contact with point 71 and point 70 in such a manner as to accomplish a full wave rectification of the alternating current or potential appearing between conductors 68 and 78 and 69 and 78, and to be measured as hereinafter more fully described.

Triode tube $T_{18}$, having its grid connected through resistor 251 and conductor 250 to the control grid of the Eccles-Jordan tube $T_5$, will be rendered alternately conductive and non-conductive in synchronism therewith and at 30 cycles per second. The resultant unidirectional pulsating anode current of 30 cycles per second will flow from tube $T_5$ through conductor 255, field coil 256 of the electromagnet 44 of the spike eliminator relay ($R_s$) and return through resistor 258, conductor 259, and conductor 260 to the positive end 108 of the voltage divider. The field coil 256 of the electromagnet 44 of the spike eliminator relay ($R_s$) will thus be energized and de-energized at a frequency of 30 cycles per second, resulting in periodic movement of the armature 41 into contact with contactor point 42 in synchronism with the operation of the first stage Eccles-Jordan trigger circuit and at a frequency of 30 cycles per second, with the result that conductors 36 and 37 leading to the voltage amplifier 38 will be periodically short-circuited by way of conductor 40, armature 41, contactor point 42, and conductor 39 thirty times a second and during the period represented by the square wave form anode current flow in tube $T_5$ illustrated at $(a)$ in Figure 2–D.

It is to be noted that as a result of the time delay introduced by the multivibrator circuit 150 and represented by the width of the square wave pulses as illustrated at $(e)$ in Figure 2–F, the phase between the anode current pulses as shown at $(a)$ in Figure 2–D, which operate the spike eliminator relay $R_s$, is shifted or displaced in time with respect to that of the square wave alternating current output from the square wave generating switching tubes $T_{14}$—$T_{17}$, as illustrated at $(n)$ and $(o)$, for example, in Figure 2–J, the amount of shift in the present example amounting to .002 second in time.

Referring now primarily to the electrical logging apparatus portion of Figure 1, as hereinbefore described, the square wave alternating current having a frequency of 15 cycles per second is caused to flow from the switching tubes $T_{14}$—$T_{17}$, as hereinbefore described, through the conductors 248 and 249 to the stationary brushes 25 and 26 which make sliding contact with drum slip rings 17 and 18, respectively, and from there the square wave alternating current flows through conductors 13 and 14 in the conductor cable 10 to the input electrodes $C_1$ and $C_2$ within the fluid in the well borehole 12. As stated before, the potential applied to the conductors leading to the input electrodes $C_1$ and $C_2$ is of a square wave alternating form tending to cause a square wave alternating current to flow having a form as illustrated by the solid lines in Figure 2–J, but the resultant current is modified by the reactance and impedance characteristics of the input circuit including those of the formations, the major effective portion of which is found to be in the form of the resistance of and electrical capacity between and distributed throughout the conductors 13 and 14 contained in the conductor cable 10. The resultant alternating current appearing at the bottom end of the conductor cable and applied to the formation through the input electrodes $C_1$ and $C_2$ is, therefore, of a slightly modified square wave form which, instead of having an ideally square form complying with that of the applied potential and current as shown in solid lines in Figure 2–J, is seen to have the initial portions of the current wave at the point of polarity reversal rounded off slightly in a curve as shown in dotted lines at 295, which curve appears in form to represent an exponential rate of change of current, the constants of which are determined mainly by the capacity and resistance of the before-mentioned conductor cable circuits to which the current is fed. Each half cycle of the approximately square wave thus consists of two principal portions, the initial, curved or transitory portion as shown at 295 beginning at 0 degrees plus .002 second and persisting through X degrees, and following that the steady or constant unidirectional portion 296 extending throughout the balance of the half cycle from X degrees to 180 degrees plus .002 second, as illustrated in Figure 2–J.

Since the alternating current of the form illustrated at 295 and 296 in Figure 2–J is, as before mentioned, applied to the formations between input electrodes $C_1$ and $C_2$, and since the formations are primarily resistive in electrical character, then the resultant alternating potential received between the potential pick-up electrodes $P_1$ and $P_2$ from the surrounding formations will be of similar form, as shown at 299 and 300, but of substantially reduced magnitude or amplitude, such amplitude being as illustrated, for example, at 297 in Figure 2–K.

Due to the coupling between the input pair of conductors 13 and 14 and the output pair of conductors 15 and 16 leading from the pick-up electrodes $P_1$ and $P_2$ and up through the conductor cable 10, said coupling being principally that due to the capacity unbalance between the conductors, although magnetic coupling may also be present to some degree, the initial transitory portion 295 of each of the input current waves, as described in connection with Figure 2–J, produces a highly peaked transitory potential across the output conductors 15 and 16 which has a typical form and phase relationship approximating that illustrated at 298 in Figure 2–K. This peaked portion 298, when superimposed upon the picked-up potential wave portion having the form illustrated by the dotted line at 299 and the solid line at 300 and having an amplitude as indicated at 297, results in an alternating potential having an overall resultant wave form as illustrated in solid lines in Figure 2–K.

The before-described resultant alternating potential having the type or form illustrated in Figure 2–K is transmitted to the input terminals 33 and 34 of the voltage amplifier 38 at the earth surface from the pair of cable conductors 15, 16 by way of the circuit comprising pick-up electrode $P_1$, cable conductor 15, slip ring 21, brush 29, conductor 31, blocking condenser 35, and conductor 36 to terminal 33 and return from terminal 34 through conductor 37 and conductor 32 to brush 30 and thence to slip ring 22, cable conductor 16 and potential pick-up electrode $P_2$.

As hereinbefore described, conductors 36 and 37 leading to the input terminals 33 and 34 of the voltage amplifier 38 are shunted by a pair of conductors 39 and 40 which lead to the contactor point 42 and the armature 41, respectively, of the spike eliminator relay ($R_s$). When the spike eliminator relay armature 41 is moved into contact with contactor 42 by energization of the electromagnet 44, a short-circuit is thereby placed between said conductors 36 and 37 leading to the input of the voltage amplifier 38, thereby rendering the amplifier 38 inactive during such short-circuiting interval. As before described, the field coil 256 of the electromagnet 44 of the spike eliminator relay $R_s$ is energized during each of the current pulses illustrated at ($a$) in Figure 2–D which represent the anode current pulsations passed through tube $T_5$. By reason of the time delay introduced by the multivibrator 150, as before described, a phase displacement occurs between the said current pulses illustrated at ($a$) in Figure 2–D which energize the spike eliminator relay and that of the square wave alternating current illustrated at ($n$) and ($o$) in Figure 2–J and the resultant picked-up potential appearing at conductors 36 and 37 in Figure 1, as illustrated in Figure 2–K. This displacement in phase, in the case herein illustrated, amounts to a time period of 2 milliseconds, as hereinbefore mentioned. Thus, by comparing the phase relationship between the current pulses shown in Figure 2–D and the picked-up potential wave illustrated in Figure 2–K, it will be seen that the spike eliminator relay $R_s$ is energized approximately 2 milliseconds prior to the occurrence of the transient peak illustrated at 298 and after a mechanical delay of approximately one millisecond required for the operation of the relay following energization, the relay closes and remains closed for a time interval illustrated at ($y$) in Figure 2–L which includes the time interval during which the transient 298 persists, after which, at the end of the current pulse cycle illustrated at ($a$) in Figure 2–D, the relay coil 44 is deenergized and the spike eliminator relay $R_s$ opens, restoring the voltage amplifier 38 to activity. This action results in only the portion of the picked-up square wave alternating potential illustrated in solid lines at ($p$) in Figure 2–L reaching the input terminals 33 and 34 of the voltage amplifier 38. Thus all of that portion of the alternating potential wave picked-up by the pick-up electrodes $P_1$ and $P_2$, whose form is influenced by or is a function of any impedance or reactance characteristics of the conductor cable and the formation being logged, is in effect entirely eliminated, leaving only that portion of the wave which is of constant value and substantially only a function of the resistivity values of the said formations to reach the input of the voltage amplifier 38 and to pass therefrom to the measuring circuit. It is, therefore, only this latter selected portion of the picked-up alternating potential which reaches the amplifiers and the electrical logging measuring or recording circuit.

The output from the power amplifier 62, which has an amplified modified square wave form proportional to and in phase with that shown in solid lines at ($p$) in Figure 2–L, is applied through conductors 68 and 69 to the opposite contactor points 70 and 71 of the rectifier relay $R_r$. Since the field coil 270 of the electromagnet 75 of the rectifier relay $R_r$ is energized by means of tube $T_{19}$ in synchronism with the operation of the switching tubes producing the initial input square wave, namely, tubes $T_{14}$—$T_{17}$, the armature 72 of the said rectifier relay is caused to vibrate at the same frequency and in synchronism therewith between the contactors 70 and 71, thereby resulting in a full-wave rectification of the amplified alternating current having a form similar to that illustrated in Figure 2–L, to produce a unidirectional pulsating current which flows through conductor 76 to the galvanometer 77 and return through conductor 78 to the center tap connection 65 of the power amplifier 62.

The galvanometer 77 employed as illustrated in Figure 1, under the above-described operating conditions, is of conventional design and responsive only to the average value or the direct current equivalent of the pulsating unidirectional potential applied to it from the rectifier relay 271. The galvanometer hand 85, which is provided with a suitable pen or marking device at its end, sweeps from side to side across the record or graph paper 82 in accordance with the variations in the average value of the before-mentioned current applied to it from the rectifier 271 and as effected by movement of the electrode system E through the borehole as different formation strata of different resistivities are encountered therein. As the electrode system is moved through the borehole, the motion of the conductor cable 10 is transferred from the pulley 87 through the Selsyn system comprising the generator 89 and the motor 92 to the roll 83 and the paper 82, thereby resulting in the forming of the logging curve as illustrated at 85, which is proportional in form to both the resistivity characteristics of the tested formations and the longitudinal displacement of the electrodes within the borehole.

The condenser 35 serves to block or exclude the flow of direct current into the input of the amplifier 38 which would result from the so-called spontaneous or natural potential difference usually existing between the pick-up electrode $P_1$ and $P_2$ in the well borehole. However, as the electrode system E moves through the well borehole and changes in the picked-up natural potential occur, such changes in potential will cause current in effect to pass through the blocking condenser 35 resulting in current flow through conductors 36 and 37 into the input of the voltage amplifier 38. Due to the action of the spike eliminator relay $R_s$, this current flow into the voltage amplifier input will be interrupted or short-circuited at a frequency of 30 cycles per second. Thus, when natural potentials are undergoing a change, a 30 cycle spurious signal will be introduced into the input of the voltage amplifier 38 which, in the absence of means to suppress it, would pass through and appear at the output of the power amplifier 62 as a 30 cycle alternating current and undergo rectification at rectifier relay $R_r$ and be introduced into the meter 77, finally appearing as a vibratory error in the amplitude of the recorded log curve 85.

To prevent the passage of the spurious 30 cycle signal to the measuring circuit, as before mentioned, a low pass filter is placed between the output of the voltage amplifier 38 and the input of the power amplifier 62, as illustrated at 53. This low pass filter has built into it attenuation characteristics such as that illustrated by the curve shown in Figure 1–A, in which frequency in cycles per second is plotted as the abscissae against the corresponding dbs of voltage attenuation as the ordinates. It is to be noted that, as indicated by this curve, the low pass filter has a maximum attenuation at 30 cycles per second and a minimum attenuation at 15 cycles per second. Thus, since the square wave alternating current introduced into the input electrodes $C_1$ and $C_2$ and picked up by the pick-up electrodes $P_1$ and $P_2$ and which finally arrives at the filter 53 has a frequency of 15 cycles per second, and since the interfering signal which may be introduced by natural potential changes and interrupted by the spike eliminator relay $R_s$ will have a frequency of 30 cycles per second, the characteristics of the low pass filter are, therefore, such that the interfering 30 cycle signal will be largely suppressed while the 15 cycle signal which it is desired to measure will be permitted to pass relatively freely to the power amplifier and thence to the measuring apparatus.

Another important feature of this low pass filter having the characteristics illustrated by the curve in Figure 1–A is that the attenuation for any 60 cycle signal is also relatively high as compared to the attenuation for the desired 15 cycle signal. This has the advantage of suppressing any undesired 60 cycle signal which may find its way through or be picked up in any manner from the 60 cycle alternating current source supplied to the primary 102 of the power transformer 101.

The D.-C. supply 218 may be of any suitable type, such as a storage battery, direct current generator, or a direct current supply system similar to that illustrated within the dotted enclosure 100. It is important that the D.-C. supply 218 be capable of delivering a constant current through the square wave switching tubes $T_{14}$–$T_{17}$ to the input electrodes $C_1$ and $C_2$ and thence to the formations, and to insure that such current be substantially constant, a suitable current regulator (not shown) may be included in the supply system 218 or in the circuit comprising conductors 217 and 242 leading to the switching tubes $T_{14}$–$T_{17}$.

As before stated, for convenience in description, a sixty cycle alternating current power source with conditions and apparatus resulting in a 30 cycle exciting current for the spike eliminator relay $R_s$ and a 15 cycle square wave output to the electrologging electrodes has been assumed. Other frequencies may obviously be employed, such as, for example, those ranging from approximately 30 to approximately 100 cycles per second for the power source with corresponding square wave output frequencies of from approximately 7½ to approximately 25 cycles per second.

The terms "measure," "measuring" or "metering" the alternating or unidirectional potential, current, or signal, as employed herein in the specification and claims are not to be limited in meaning necessarily to actual quantitative determination of such values in terms of volts, amperes, or the like, but include measuring, indicating, or recording relative values or variations therein or suitable functions thereof. It is obvious that, in a number of places in the apparatus herein-described, twin or multi-unit tubes having single envelopes may be substituted for several of the separate electron tubes illustrated. For example, the two diodes $T_2$ and $T_3$ may be replaced by a suitable twin diode electron tube. Likewise, the several pairs of cross-connected tubes in the several trigger circuits and the pairs of tubes in the switching circuits may be replaced by single, twin unit tubes. For example, tubes $T_4$ and $T_5$ of the trigger circuit 125 may be replaced with a suitable twin triode electron tube.

With the foregoing possibility of employing multi-unit tubes, and for convenience of description and expression but not by way of limitation, the electron tubes including their necessary and various electrode elements have been occasionally referred to herein as electron discharge paths. Such electron discharge paths need not necessarily originate from separate cathodes but may, in some cases, as is well known in the art, be emitted from a single or common cathode.

It is to be understood that the foregoing is illustrative only, and that the invention is not limited thereby but includes all modifications thereof within the scope of definition of the appended claims.

What is claimed is:

1. In combination: a first trigger circuit having two electron discharge paths, a control grid and anode in each path and impedance elements cross-connecting the anode of each path to the control grid of the other path such that said first trigger circuit has two degrees of electrical stability; a connection and means for applying periodic negative potential pulses of a given frequency simultaneously to both of said control grids for tripping conductivity alternately from one discharge path to the other; a multivibrator circuit having two electron discharge paths, a control grid and anode in each path and impedance elements cross-connecting the anode of each path to the control grid of the other path and unsymmetrically biased such that said multivibrator circuit has only one degree of electrical stability whereby one of said discharge paths is normally conducting and the other is normally non-conducting; means to regulate the time interval of conductivity of said normally non-conductive discharge path; a first differentiating circuit forming a coupling between an output electrode of one discharge path of said first trigger circuit and the control grid of one path of the multivibrator circuit for transferring sharply peaked, short duration potential pulses thereto for tripping the conductivity from the normally conducting discharge path momentarily to the normally non-conducting discharge path and return once for each such pulse; a second trigger circuit like the first trigger circuit; a second differentiating circuit forming a coupling between an output electrode of said normally conducting discharge path of said multivibrator circuit and both of the control grids of said second trigger circuit for applying periodic negative pulses simultaneously to both of the control grids thereof for tripping conductivity alternately from one discharge path to the other, each such negative pulse occurring during each triggered cycle of operation at the instant of each return of conductivity to the normally conducting discharge path of said multivibrator; and a connection from an output electrode of a discharge path of said second trigger circuit whereby a pulsating potential may be obtained therefrom having a frequency one-fourth that of said first-mentioned given frequency and displaced therefrom in phase by a time interval equal to the time duration of non-conductivity of the normally conducting discharge path of said multivibrator.

2. In combination: a first trigger circuit having two electron discharge paths, a control grid and anode in each path and impedance elements cross-connecting the anode of each path to the control grid of the other path such that said first trigger circuit has two degrees of electrical stability; a connection and means for applying periodic negative potential pulses of a given frequency simultaneously to both of said control grids for tripping conductivity alternately from one discharge path to the other; a multivibrator circuit having two electron discharge paths, a control grid and anode in each path and impedance elements cross-connecting the anode of each path to the control grid of the other path and unsymmetrically biased such that said multivibrator circuit has only one degree of electrical stability whereby one of said discharge paths is normally conducting and the other is normally non-conducting; means to regulate the time interval of conductivity of said normally non-conductive discharge path; a first differentiating circuit forming a coupling between an output electrode of one discharge path of said first trigger circuit and the control grid of the normally conducting discharge path of the multivibrator circuit for transferring sharply peaked, short duration negative potential pulses thereto for tripping the conductivity from said normally conducting discharge path momentarily to the normally non-conducting discharge path and return once for each such pulse; a second trigger circuit like the first trigger circuit; a second differentiating circuit forming a coupling between an output electrode of said normally conducting discharge path of said multivibrator circuit and both of the control grids of said second trigger circuit for applying periodic negative pulses simultaneously to both of the control grids thereof for tripping conductivity alternately from one discharge path to the other, each such negative pulse occurring during each triggered cycle of operation at the instant of each return of conductivity to the normally conducting discharge path of said multivibrator; and a connection from an output electrode of a discharge path of said second trigger circuit whereby a pulsating potential may be obtained therefrom having a frequency one-fourth that of said first-mentioned given frequency and displaced therefrom in phase by a time interval equal to the time duration of non-conductivity of the normally conducting discharge path of said multivibrator.

3. In combination: a first trigger circuit having two electron discharge paths, a control grid and anode in each path and impedance elements cross-connecting the anode of each path to the control grid of the other path such that said first trigger circuit has two degrees of electrical stability; a connection and means for applying periodic negative potential pulses of a given frequency simultaneously to both of said control grids for tripping conductivity alternately from one discharge path to the other; a multivibrator circuit having two electron discharge paths, a control grid and anode in each path and impedance elements cross-connecting the anode of each path to the control grid of the other path and unsymmetrically biased such that said multivibrator circuit has only one degree of electrical stability and a given time constant; a first differentiating circuit forming a coupling between an output electrode of one discharge path of said first trigger circuit and the control grid of the normally conducting discharge path of the multivibrator circuit for transferring sharply peaked short duration negative potential pulses thereto for tripping the conductivity from said normally conducting discharge path momentarily to the normally non-conducting discharge path and return once for each such pulse; a second trigger circuit like the first trigger circuit; a second differentiating circuit forming a coupling between an output electrode of said normally conducting discharge path of said multivibrator circuit and both of the control grids of said second trigger circuit for applying periodic positive pulses simultaneously to both of the control grids thereof for tripping conductivity alternately from one discharge path to the other, each such negative pulse occurring during each triggered cycle of operation at the instant of each return of conductivity to the normally conducting discharge path of said multivibrator; a first pair and a second pair of independent electron discharge paths with each of said pairs having a first and second discharge path; a cathode, control electrode and output electrode in each of said first and second discharge paths; a connection coupling an output electrode of one of the discharge paths of said second trigger circuit to the control electrode of said first pair of paths; a connection coupling an output electrode of the other of the discharge paths of said second trigger circuit to the control electrodes of said second pair of paths; a cross-connection from an output electrode of the first one of said first pair of paths to the cathode of the first one of said second pair of paths; a cross-connection from the output electrode of the second one of said second pair of paths to the cathode of the second one of the said first pair of paths; a source of direct current; a connection from the negative side of said source to the cathode of said first one of said first and to the cathode of said second one of said second pair of paths; a connection from the positive side of said source to the output electrode of said second one of said first and to the output electrode of said first one of said second pair of paths; and a pair of output connections, one leading from one of said cross-connections and the other leading from the other of said cross-connections from which may be obtained an alternating signal having a substantially square wave form and a frequency one-fourth that of said first-mentioned given frequency and displaced in phase by a time interval equal to the time duration of conductivity of the normally non-conducting discharge path of said multivibrator.

4. In combination: a trigger circuit having two electron discharge paths, a control grid and anode in each path and impedance elements cross-connecting the anode of each path to the control grid of the other path such that said trigger circuit has two degrees of electrical stability; a connection and means for applying periodic negative potential pulses of a given frequency simultaneously to both of said control grids for tripping conductivity alternately from one discharge path to the other; a first pair and a second pair of independent electron discharge paths with each of said pairs having a first and second discharge path; a cathode, control electrode and output electrode in each of said first and second discharge paths; a connection coupling an output electrode of one of the discharge paths of said trigger circuit to the control electrode of said first pair of paths; a connection coupling an output electrode of the other of the discharge paths of said trigger circuit to the control electrodes of said second pair of paths; a cross-connection from an output electrode of the first one of said first pair of paths to the cathode of the first one of said second pair of paths; a cross-connection from the output electrode of the second one of said second pair of paths to the cathode of the second one of the said first pair of paths; a source of direct current; a connection from the negative side of said source to the cathode of said first one of said first and to the cathode of said second one of said second pairs of paths; a connection from the positive side of said source to the output electrode of said second one of said first and to the output electrode of said first one of said second pair of paths; and a pair of output connections, one leading from one of said cross-connections and the other leading from the other of said cross-connections from which may be obtained an alternating signal having a substantially square wave form and a frequency one-half that of said first-mentioned given frequency.

5. In combination: a first pair and a second pair of independent discharge paths with each of said pairs having a first and second discharge path; a cathode, control electrode and an output electrode in each of said discharge paths; a cross-connection between the output electrode of the first one of said first pair of paths and the cathode of the first one of said second pair of paths; a cross-connection between the output electrode of the second one of said second pair of paths and the cathode of the second one of the said first pair of paths; a source of direct current; a connection from the negative side of said source to the cathode of said first one of said first and to the cathode of said second one of said second pair of paths; a connection from the positive side of said source to the output electrode of said second one of said first and to the output electrode of said first one of said second pairs of paths; a pair of output connections, one leading from one of said cross-connections and the other leading from the other of said cross-connections; a source of negative potential pulsations; means to apply said pulsations alternately to the control electrodes of said first pair of paths and to the control electrodes of said second pair of paths, whereby an alternating signal may be obtained from said output connections.

6. In combination: a first pair and a second pair of independent discharge paths with each of said pairs having a first and second discharge path; a cathode, control electrode and an output electrode in each of said discharge paths; a cross-connection between the output electrode of the first one of said first pair of paths and the cathode of the first one of said second pair of paths; a cross-connection between the output electrode of the second one of said second pair of paths and the cathode of the second one of the said first pair of paths; a source of direct current; a connection from the negative side of said source to the cathode of said first one of said first and to the cathode of said second one of said second pairs of paths; a connection from the positive side of said source to the output electrode of said second one of said first and to the output electrode of said first one of said second pairs of paths; a pair of output connections, one leading from one of said cross-connections and the other leading from the other of said cross-connections; a source of negative potential pulsations of substantially square wave form; means to apply said pulsations alternately to the control electrodes of said first pair of paths and to the control electrodes of said second pair of paths, said potential of said pulses being sufficient to drive said control electrodes to the cut-off potential of their respective discharge paths, whereby an alternating signal having a substantially square wave form may be obtained from said output connections.

7. In electrical logging apparatus wherein a pulsating current of substantially square wave form is conducted through an input conductor contained in a conductor cable to an input current electrode in a borehole to establish a pulsating electric field of approximately square wave form in the surrounding formations around said electrode and wherein a portion of said pulsating electric field is tested by a pair of spaced potential pick-up electrodes in said borehole and the approximately square wave signal thus picked up by said pick-up electrodes is conducted through a pair of conductors contained in said conductor cable to an electric metering device at the surface, exterior to said borehole, the apparatus comprising: a first trigger circuit having two electron discharge paths, a control grid, an anode in each path and impedance elements cross-connecting the anode of each path to the control grid of the other path such that said first trigger circuit has two degrees of electrical stability; a connection and means for applying periodic, negative potential pulses of a given frequency simultaneously to both of said control grids for tripping conductivity alternately from one discharge path to the other; a multivibrator circuit having two electron discharge paths, a control grid and anode in each path and impedance elements cross-connecting each anode of each path to the control grid of the other path and unsymmetrically biased such that said multivibrator circuit has only one degree of electric stability and a given time constant; a first differentiating circuit forming a coupling between said output electrode of one discharge path of said first trigger circuit and the control grid of the normally conducting discharge path of the multivibrator circuit for transferring sharply-peaked, short duration negative potential pulses thereto for tripping the conductivity from said normally conducting discharge path momentarily to the normally non-conducting discharge path and return once for each such pulse; a second trigger circuit like the first trigger circuit; a second differentiating circuit forming a coupling between an output electrode of said normally conducting discharge path of said multivibrator circuit and both of the control grids of said second trigger circuit for applying periodic negative pulses simultaneously to both of the control grids thereof for tripping conductivity alternating from one discharge path thereof to the other, each such negative pulse occurring during each triggered cycle of operation at the instant of each return of conductivity to the normally conducting discharge path of said multivibrator; a first pair and a second pair of independent electron discharge paths with each of said pairs having a first and second discharge path; a cathode, control electrode and output electrode in each of said first and second discharge paths; a connection coupling an output electrode of one of the discharge paths of said second trigger circuit to the control electrode of said first pair of paths; a connection coupling an output electrode of the other of the discharge paths of said second trigger circuit to the control electrodes of said second pair of paths; a cross-connection from an output electrode of the first one of said first pair of paths to the cathode of the first one of said second pair of paths; a cross-connection from the output electrode of the second one of said second pair of paths to the cathode of the second one of the said first pair of paths; a source of direct current; a connection from the negative side of said source to the cathode of said first one of said first and to the cathode of said second one of said second pair of paths; a connection from the positive side of said source to the output electrode of said second one of said first and to the output electrode of said first one of said second pair of paths; a pair of output connections, one leading from one of said cross-connections and the other leading from the other of said cross-connections from which may be obtained a pulsating current of substantially square wave form and a frequency one-fourth that of said first-mentioned given frequency and displaced in phase therefrom by a time interval equal to the time duration of conductivity of the normally non-conducting discharge path of said multivibrator; a connection from one of said output connections to said input conductor contained in said conductor cable; a connection from the other of said output connections to a grounded electrode whereby said pulsating current of substantially square wave form is conducted through said input electrodes and said electric field is established in the surrounding formations; an electric metering device; electrical connections to said electrical metering device from said pair of conductors contained in said conductor cable leading from said pick-up electrodes; switching means associated with said electrical connections, intermediate the said pair of conductors in said cable and said electric metering device for control of the time and duration of the application of the said pulsating signal from said pair of conductors from said pick-up electrodes to said electric metering device, said switching means being electrically coupled to and synchronously actuated by the output from an output electrode of one of said discharge paths of said first trigger circuit, whereby the pulsating signal reaching said meter is interrupted at an interruption frequency twice that of the frequency of said pulsating signal and displaced therefrom in phase by a time interval equal to the time duration of non-conductivity of the normally conducting discharge path of said multivibrator.

8. In an electrical logging apparatus wherein an alternating current of substantially square wave form is conducted through an input conductor contained in a conductor cable to an input current electrode in a borehole to establish an alternating electric field of approximately square wave form in the surrounding formations around said electrode and wherein a portion of said alternating electric field is tested by a pair of spaced potential pick-up electrodes in said borehole and the approximately square wave signal thus picked up by said pick-up electrodes is conducted through a pair of conductors contained in said conductor cable to an electric metering device at the surface, exterior to said borehole, the apparatus comprising: a first trigger circuit having two electron discharge paths, a control grid, an anode in each path and impedance elements cross-connecting the anode of each path to the control grid of the other path such that said first trigger circuit has two degrees of electrical stability; a connection and means for applying periodic, negative potential pulses of a given frequency simultaneously to both of said control grids for tripping conductivity alternately from one discharge path to the other; a multivibrator circuit having two electron discharge paths, a control grid and anode in each path and impedance elements cross-connecting each anode of each path to the control grid of the other path and unsymmetrically biased such that said multivibrator circuit has only one degree of electric stability and a given time constant; a first differentiating circuit forming a coupling between an output electrode of one discharge path of said first trigger circuit and the control grid of the normally conducting discharge path of the multivibrator circuit for transferring sharply-peaked, short duration negative potential pulses thereto for tripping the conductivity from said normally conducting discharge path momentarily to the normally non-conducting discharge path and return once for each such pulse; a second trigger circuit like the first trigger circuit; a second differentiating circuit forming a coupling between an output electrode of said normally conducting discharge path of said multivibrator circuit and both of the control grids of said second trigger circuit for applying periodic negative pulses simultaneously to both of the control grids thereof for tripping conductivity alternately from one discharge path thereof to the other, each such negative pulse occurring during each triggered cycle of operation at the instant of each return of conductivity to the normally conducting discharge path of said multivibrator; a first pair and a second pair of independent electron discharge paths with each of said pairs having a first and second discharge path; a cathode, control electrode and output electrode in each of said first and second discharge paths; a connection coupling an output electrode of one of the discharge paths of said second trigger circuit to the control electrode of said first pair of paths; a connection coupling an output electrode of the other of the discharge paths of said second trigger circuit to the control electrodes of said second pair of paths; a cross-connection from an output electrode of the first one of said first pair of paths to the cathode of the first one of said second pair of paths; a cross-connection from the output electrode of the second one of said second pair of paths to the cathode of the second one of the said first pair of paths; a source of direct current; a connection from the negative side of said source to the cathode of said first one of said first and to the cathode of said second one of said second pair of paths; a connection from the positive side of said source to the output electrode of said second one of said first and to the output electrode of said first one of said second pair of paths; a pair of output connections, one leading from one of said cross-connections and the other leading from the other of said cross-connections from which may be obtained an alternating current of substantially square wave form and a frequency one-fourth that of said first-mentioned given frequency and displaced in phase therefrom by a time interval equal to the time duration of conductivity of the normally non-conducting discharge path of said multivibrator; a connection from one of said output connections to said input conductor contained in said conductor cable; a connection from the other of said output connections to a grounded electrode whereby said alternating current of substantially square wave form is conducted through said input electrode and said electric field is established in the surrounding formations; an electric metering device; electrical connections to said electrical metering device from said pair of conductors contained in said conductor cable leading from said pick-up electrodes; switching means associated with said electrical connections intermediate the said pair of conductors in said cable and said electric metering device for control of the time and duration of the application of the said alternating signal from said pair of conductors from said pick-up electrodes to said electric metering device, said switching means being electrically coupled to and synchronously actuated by the output from an output electrode of one of said discharge paths of said first trigger circuit, whereby the alternating signal reaching said meter is interrupted at an interruption frequency twice that of the frequency of said alternating signal and displaced therefrom in phase by a time interval equal to the time duration of non-conductivity of the normally conducting discharge path of said multivibrator.

9. In electrical logging apparatus wherein a current is conducted through an input conductor contained in a conductor cable to an input current electrode in a borehole to establish an electric field in surrounding formations around said electrode and wherein a portion of such electric field is tested by a pair of spaced potential pick-up electrodes in said borehole and the potential thus picked up is conducted through a pair of conductors contained in said conductor cable to measuring apparatus at the surface exterior to said borehole, apparatus comprising: means for generating an electric potential having an alternating potential component of a given frequency and a substantially square wave form; means for applying said generated potential to said conductor leading to said input electrode to thereby establish an electric field in the surrounding formations having an alternating potential component of said frequency and an approximately square wave form; means for picking up a potential corresponding to a portion of said electric field together with any natural potential existing at said potential pick-up electrodes; means for applying the thus picked-up potentials to the said pair of conductors; receiving means for receiving from said pair of conductors at the earth surface exterior to the borehole a pulsating potential comprising said picked-up alternating potential component and natural potentials together with superimposed transients produced in said pair of conductors; means for interrupting said pulsating potential received by said receiving means, at an interruption frequency twice that of said generated alternating potential component and with each such interruption being so phased and for such a time interval as to be inclusive of that portion of each half cycle of said pulsating potential received by said receiving means from said pair of conductors, containing said transients, to obtain therefrom a resultant interrupted pulsating signal free from such transients but containing signal components having both said interruption frequency and said generated alternating potential component frequency; and metering apparatus, relatively insensitive to said interrupted frequency, for measuring the said resultant pulsating signal.

10. In electrical logging apparatus wherein a current is conducted through an input conductor contained in a conductor cable to an input current electrode in a borehole to establish an electric field in surrounding formations around said electrode and wherein a portion of such electric field is tested by a pair of spaced potential pick-up electrode in said borehole and the potential thus picked up is conducted through a pair of conductors contained in said conductor cable to measuring apparatus at the surface exterior to said borehole, apparatus comprising: means for generating an electric potential having an alternating potential component of a given frequency and a substantially square wave form; means for applying said generated potential to said conductor leading to said input electrode to thereby establish an electric field in the surrounding formations having an alternating potential component of said frequency and an approximately square wave form; means for picking up a potential corresponding to a portion of said electric field together with any natural potential existing at said potential pick-up electrodes; means for applying the thus picked-up potentials to the said pair of conductors; receiving means for receiving from said pair of conductors at the earth surface exterior to the borehole a pulsating potential comprising said picked-up alternating potential component and natural potentials together with superimposed transients produced in said pair of conductors; means for interrupting said pulsating potential received by said receiving means, at an interruption frequency twice that of said generated alternating potential component and with each such interruption being so phased and for such a time interval as to be inclusive of that portion of each half cycle of said pulsating potential received by said receiving means from said pair of conductors, containing said transients, to obtain therefrom a resultant interrupted pulsating signal free from such transients but containing signal components having both said interruption frequency and said generated alternating potential component frequency; a low pass filter having a relatively high attenuation at said interruption frequency as compared to that at the frequency of said alternating potential component; means for subjecting said resultant pulsating signal to the action of said filter; and means for measuring the modified pulsating signal resulting from said action of said filter.

11. In electrical logging apparatus wherein a current is conducted through an input conductor contained in a conductor cable to an input current electrode in a borehole to establish an electric field in surrounding formations around said electrode and wherein a portion of such electric field is tested by a pair of spaced potential pick-up electrodes in said borehole and the potential thus picked up is conducted through a pair of conductors contained in said conductor cable to measuring apparatus at the surface exterior to said borehole, apparatus comprising: means for generating an electric potential having an alternating potential component of a wave form including a substantially constant amplitude portion in the cycle; means for applying said generated potential to said conductor leading to said input electrode to thereby establish an electric field in the surrounding formations having an alternative potential component of said frequency and having a wave form including an approximately constant ampltiude portion in the cycle; means for picking up a potential corresponding to a portion of said electric field together with any unidirectional natural potential existing at said potential pick-up electrodes; means for applying the thus picked-up potentials to said pair of conductors; receiving means for receiving from said pair of conductors at the earth surface exterior to the borehole a pulsating potential comprising said picked-up alternating potential component and unidirectional natural potentials together with superimposed transients produced in said pair of conductors; means for interrupting said pulsating potential received by said receiving means, at an interruption frequency twice that of said generated alternating potential component and with each such interruption being so phased and for such a time interval as to be inclusive of that portion of each cycle of said pulsating potential received by said receiving means from said pair of conductors containing said transients, but exclusive of a portion thereof containing a substantially constant amplitude potential portion, to obtain therefrom a resulant inerrupted pulsating signal of approximately square wave form, free from such transients but containing signal components having both said interruption frequency and said generated alternating potential component frequency; and metering apparatus, relatively insensitive to said interruption frequency, for measuring the said resultant pulsating signal.

12. In electrical logging apparatus wherein a current is conducted through an input conductor contained in a conductor cable to an input current electrode in a borehole to establish an electric field in surrounding formations around said electrode and wherein a portion of such electric field is tested by a pair of spaced potential pick-up electrodes in said borehole and the potential thus picked up is conducted through a pair of conductors contained in said conductor cable to measuring apparatus at the surface exterior to said borehole, apparatus comprising: means for generating an electric potential having an alternating potential component of a wave form including a substantialiy constant amplitude portion in the cycle; means for applying said generated potential to said conductor leading to said input electrode to thereby establish an electric field in the surrounding formations having an alternating potential component of said frequency and having a wave form including an approximately constant amplitude portion in the cycle; means for picking up a potential corresponding to a portion of said electric field together with any unidirectional natural potential existing at said potential pick-up electrodes; means for applying the thus picked-up potentials to said pair of conductors; receiving means for receiving from said pair of conductors at the earth surface exterior to the borehole a pulsating potential comprising said picked-up alternating potential component and unidirectional natural potential together with superimposed transients produced in said pair of conductors; means for interrupting said pulsating potential received by said receiving means, at an interruption frequency twice that of said generated alternating potential component and with each such interruption being so phased and for such a time interval as to be inclusive of that portion of each cycle of said pulsating potential received by said receiving means from said pair of conductors containing said transients, but exclusive of a portion thereof containing a substantially constant amplitude potential portion, to obtain therefrom a resultant interrupted pulsating signal of approximately square wave form, free from such transients but containing signal components having both said interruption frequency and said generated alternating potential component frequency; a low pass filter having a relatively high attenuation at said interruption frequency as compared to that at the frequency of said alternating potential component; means for subjecting said resultant pulsating signal to the action of said filter; and means for measuring the modified pulsating signal resulting from said action of said filter.

13. In electrical logging apparatus wherein an alternating current is conducted through an input conductor contained in a conductor cable to an input current electrode in a borehole to establish an electric field in surrounding formations around said electrode and wherein a portion of such electric field is tested by a pair of spaced potential pick-up electrodes in said borehole and the potential thus picked up is conducted through a pair of conductors contained in said conductor cable to measuring apparatus at the earth surface exterior to said borehole, apparatus comprising: means for generating an alternating electric potential having a given frequency and a square wave form; means for applying said generated alternating potential to said conductor leading to said input electrode to thereby establish an alternating electric field in the surrounding formations having said frequency and an approximately square wave form; means for picking up a potential corresponding to a portion of said alternating electric field together with any natural unidirectional potential existing at said potential pick-up electrodes; means for applying the thus picked-up potentials to the said pair of conductors; receiving means for receiving from said pair of conductors at the earth surface exterior to the borehole a pulsating potential comprising said picked-up alternating and natural potentials together with superimposed transients produced in said pair of conductors; means for interrupting said potentials received by said receiving means, at an interruption frequency twice that of the said generated alternating potential and with each said interruption being so phased and for such a time interval as to be inclusive of that portion of each half cycle of said picked-up potential containing said transients, to obtain therefrom a resultant interrupted pulsating signal free of such transients but containing components having both said interruption frequency and said generated alternating potential frequency; and metering apparatus, relatively insensitive to said interruption frequency, for measuring the said resultant pulsating signal.

14. In electrical logging apparatus wherein an alternating current is conducted through an input conductor contained in a conductor cable to an input current electrode in a borehole to establish an electric field in surrounding formations around said electrode and wherein a portion of such electric field is tested by a pair of spaced potential pick-up electrodes in said borehole and the potential thus picked up is conducted through a pair of conductors contained in said conductor cable to measuring apparatus at the earth surface exterior to said borehole, apparatus comprising: means for generating an alternating electric potential having a given frequency and a square wave form; means for applying said generated alternating potential to said conductor leading to said input electrode to thereby establish an alternating electric field in the surrounding formations having said frequency and an approximately square wave form; means for picking up a potential corresponding to a portion of said alternating electric field together with any natural unidirectional potential existing at said potential pick-up electrodes; means for applying the thus picked-up potentials to the said pair of conductors; receiving means for receiving from said pair of conductors at the earth surface exterior to the borehole a pulsating potential comprising said picked-up alternating and natural potentials together with superimposed transients produced in said pair of conductors; means for interrupting said potentials received by said receiving means, at an interruption frequency twice that of the said generated alternating potential and with each said interruption being so phased and for such a time interval as to be inclusive of that portion of each half cycle of said picked-up potential containing said transients, to obtain therefrom a resultant interrupted pulsating signal free of such transients but containing components having both said interruption frequency and said generated alternating potential frequency; a low pass filter having a relatively high attenuation at said interruption frequency as compared to the attenuation thereof at the frequency of said generated electric potential; means for subjecting said resultant pulsating signal to the action of said filter; and means for measuring the modified pulsating signal resulting from said action of said filter.

References Cited in the file of this patent
UNITED STATES PATENTS

| Number | Name | Date |
|---|---|---|
| 1,826,961 | Slichter | Oct. 13, 1931 |
| 2,046,436 | Waschek | July 7, 1936 |
| 2,324,797 | Norton | July 20, 1943 |
| 2,363,987 | Muzzey | Nov. 28, 1944 |
| 2,398,761 | Aiken | Apr. 23, 1946 |
| 2,409,689 | Morton | Oct. 22, 1946 |
| 2,420,200 | Schoenfeld | May 6, 1947 |